(12) United States Patent
Kawahara et al.

(10) Patent No.: US 10,212,336 B2
(45) Date of Patent: Feb. 19, 2019

(54) IMAGING SUPPORT APPARATUS, IMAGING SUPPORT METHOD, AND COMPUTER PROGRAM PRODUCT

(71) Applicant: Kabushiki Kaisha Toshiba, Minato-ku, Tokyo (JP)

(72) Inventors: Tomokazu Kawahara, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/260,669

(22) Filed: Sep. 9, 2016

(65) Prior Publication Data

US 2017/0272647 A1    Sep. 21, 2017

(30) Foreign Application Priority Data

Mar. 17, 2016 (JP) .................. 2016-054472

(51) Int. Cl.
*H04N 5/225* (2006.01)
*H04N 5/232* (2006.01)
(Continued)

(52) U.S. Cl.
CPC ....... *H04N 5/23222* (2013.01); *G06K 9/4604* (2013.01); *H04N 5/2256* (2013.01); (Continued)

(58) Field of Classification Search
CPC ........ H04N 7/144; H04N 7/141; H04N 7/142; H04N 7/15; H04N 7/155; H04N 7/157; (Continued)

(56) References Cited

U.S. PATENT DOCUMENTS 5,430,473 A * 7/1995 Beecher, II ............ H04N 7/142
348/14.05
7,693,308 B2    4/2010 Ono et al.
(Continued)

FOREIGN PATENT DOCUMENTS

JP    2001-056859 A    2/2001
JP    2005-310103 A    11/2005
(Continued)

OTHER PUBLICATIONS

Mita, T., et al., "Discriminative Feature Co-Occurrence Selection for Object Detection", IEEE Transaction Pattern Analysis and Machine Intelligence, vol. 30, No. 7, Jul. 2008, pp. 1257-1269.

*Primary Examiner* — Kelly L Jerabek
(74) *Attorney, Agent, or Firm* — Knobbe, Martens, Olson & Bear, LLP

(57) ABSTRACT

According to an embodiment, an imaging support apparatus includes a memory and a processor. The processor acquires a plurality of images obtained by imaging a face of a subject by a plurality of imaging devices. The processor extracts a face area from each of the plurality of images. The processor specifies a certain imaging device as an imaging device suitable for imaging the face of the subject face among the plurality of imaging devices based on a position of the face area in each of the plurality of images. The processor causes a suggestion device to suggest a direction toward which the face of the subject is to be directed for imaging the face of the subject by the certain imaging device.

20 Claims, 13 Drawing Sheets

(51) Int. Cl.
*H04N 5/247* (2006.01)
*G06K 9/46* (2006.01)

(52) U.S. Cl.
CPC ..... *H04N 5/23219* (2013.01); *H04N 5/23293* (2013.01); *H04N 5/247* (2013.01)

(58) Field of Classification Search
CPC .... H04N 1/00408; G06F 3/005; G03B 17/18; G03B 17/20; G03B 2217/002
USPC ......... 348/211.12–211.13, 135, 169, 333.02, 348/333.04, 373
See application file for complete search history.

(56) References Cited

U.S. PATENT DOCUMENTS

| | | | | |
|---|---|---|---|---|
| 7,806,604 B2* | 10/2010 | Bazakos | ............ | G06K 9/00255 348/153 |
| 8,045,001 B2 | 10/2011 | Nakao et al. | | |
| 8,711,201 B2* | 4/2014 | Gorzynski | ............ | H04N 7/147 348/14.01 |
| 9,036,875 B2 | 5/2015 | Yuasa | | |
| 9,405,966 B2 | 8/2016 | Yuasa | | |
| 2001/0011951 A1* | 8/2001 | Kimata | ................... | H04N 7/142 340/815.4 |
| 2011/0096137 A1* | 4/2011 | Baker | .................... | H04N 7/147 348/14.08 |
| 2013/0021491 A1* | 1/2013 | Lee | ........................ | H04N 19/56 348/222.1 |
| 2014/0184736 A1* | 7/2014 | Thapliyal | ............... | H04N 7/144 348/14.16 |
| 2014/0219519 A1* | 8/2014 | Yuasa | ................. | G06K 9/00255 382/118 |
| 2016/0134838 A1* | 5/2016 | Tangeland | ............. | H04N 7/147 348/14.09 |

FOREIGN PATENT DOCUMENTS

| | | |
|---|---|---|
| JP | 2007-067510 A | 3/2007 |
| JP | 4265600 B2 | 5/2009 |
| JP | 2014-153817 A | 8/2014 |
| JP | 2015-114917 A | 6/2015 |

* cited by examiner

FIG.9
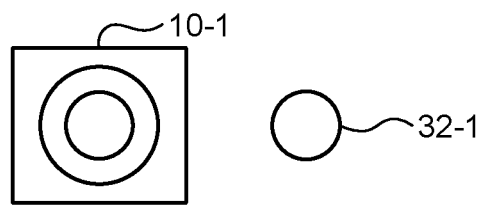
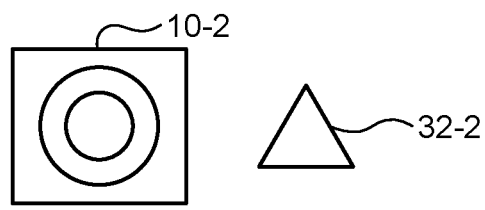
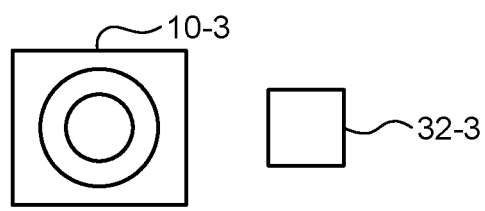
FIG.10
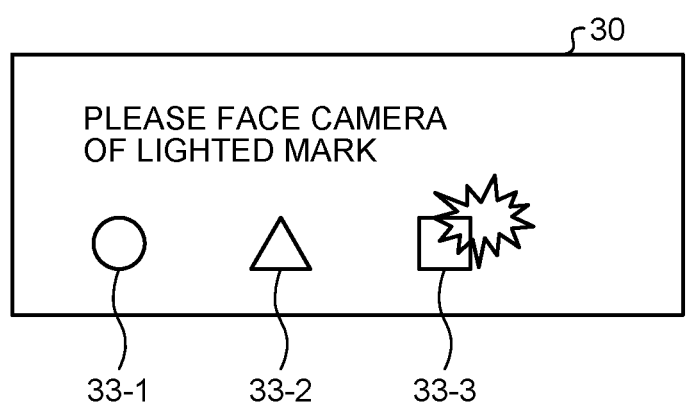

190
180
170
160
150
140
130
120
110

IMAGING SUPPORT APPARATUS, IMAGING SUPPORT METHOD, AND COMPUTER PROGRAM PRODUCT

CROSS-REFERENCE TO RELATED APPLICATIONS

This application is based upon and claims the benefit of priority from Japanese Patent Application No. 2016-054472, filed on Mar. 17, 2016; the entire contents of which are incorporated herein by reference.

FIELD

Embodiments described herein relate generally to an imaging support apparatus, an imaging support method, and a computer program product.

BACKGROUND

Hitherto, a face recognition technology of recognizing a subject by the use of a subject's face image captured by an imaging unit has been known.

As such a face recognition technology, a technology of capturing a subject's face image by a plurality of imaging units, selecting an image suitable for face recognition from the plurality of captured face images, and recognizing a subject by using the selected image has been known.

BRIEF DESCRIPTION OF THE DRAWINGS

FIG. 9 is a schematic diagram illustrating an example of identification information of a second modified example;

FIG. 10 is a schematic diagram illustrating an example of a suggestion unit of the second modified example;

DETAILED DESCRIPTION

According to an embodiment, an imaging support apparatus includes a memory and a processor. The processor acquires a plurality of images obtained by imaging a face of a subject by a plurality of imaging devices. The processor extracts a face area from each of the plurality of images. The processor specifies a certain imaging device as an imaging device suitable for imaging the face of the subject face among the plurality of imaging devices based on a position of the face area in each of the plurality of images. The processor causes a suggestion device to suggest a direction toward which the face of the subject is to be directed for imaging the face of the subject by the certain imaging device.

Hereinafter, embodiments will be described in detail with reference to the accompanying drawings.

First Embodiment

Figure 1:
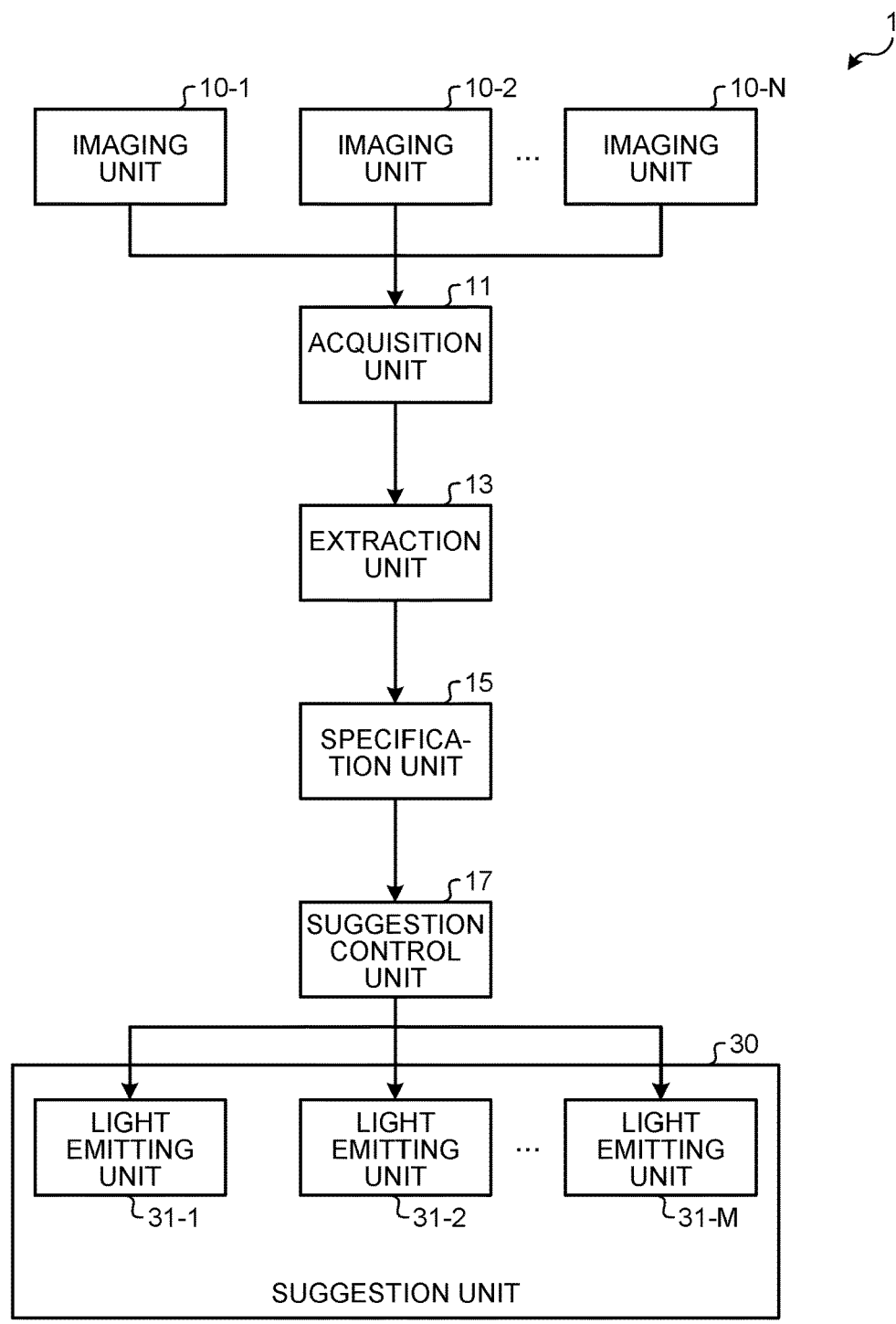
FIG. 1 is a configuration diagram illustrating an example of an imaging support apparatus of a first embodiment.

FIG. 1 is a configuration diagram illustrating an example of an imaging support apparatus 1 of a first embodiment. As illustrated in FIG. 1, the imaging support apparatus 1 includes imaging units 10-1 to 10-N (N is an integer of 2 or more), an acquisition unit 11, an extraction unit 13, a specification unit 15, a suggestion control unit 17, and a suggestion unit 30.

Each of the imaging units 10-1 to 10-N can be implemented as, for example, an imaging device such as a video camera capable of capturing moving images or a camera capable of continuously capturing still images. Further, in the description below, an example will be described in which three imaging units (N=3) are provided, but the embodiment is not limited thereto. Further, when there is no need to distinguish the imaging units 10-1 to 10-N in the description below, the imaging unit 10 will be used simply.

The acquisition unit 11, the extraction unit 13, the specification unit 15, and the suggestion control unit 17 may be implemented as, for example, a program executed in a process device such as a CPU (Central Processing Unit), that is, software, hardware such as an IC (Integrated Circuit), or a combination of software and hardware.

In the first embodiment, the suggestion unit 30 includes light emitting units 31-1 to 31-M (M is an integer of 2 or more). Each of the light emitting units 31-1 to 31-M can be implemented as, for example, a light emitting device such as an LED (Light Emitting Diode) or a lamp. Further, in the description below, an example will be described in which three light emitting units (M=3) are provided, but the embodiment is not limited thereto. Further, when there is no need to distinguish the light emitting units 31-1 to 31-M in the description below, the light emitting unit 31 will be used simply.

The imaging units 10-1 to 10-3 image a face of a subject. The subject is a person which is a face recognition target. In the first embodiment, the imaging units 10-1 to 10-3 are arranged in the vertical direction, and the arrangement positions and the arrangement directions of the imaging units 10-1 to 10-3 are fixed. Thus, it is possible to capture a face image suitable for the face recognition by any one of the imaging units 10-1 to 10-3 without changing the arrangement position and the arrangement direction of the imaging unit 10 even when the subject is tall.

The face image suitable for face recognition in the first embodiment is an image in which the face is directed forward and the face is not distorted (an image in which the distortion of the face is suppressed). The distortion of the face on the image is caused by the influence of an imaging lens (not illustrated) of the imaging unit 10, and the distortion increases as it goes away from an optical axis of the imaging lens. For this reason, the face image suitable for face recognition in the first embodiment can be obtained by capturing an image of the subject from the imaging unit 10 located in front of the subject's face.

In the first embodiment, since the imaging units 10-1 to 10-3 are arranged in the vertical direction as described above, any one of the imaging units 10-1 to 10-3 is substantially located at the same height as that of the subject's face even when the subject is tall. Here, the subject's face needs to be directed toward the imaging unit 10 substantially located at the same height as that of the face in order to capture the face image suitable for face recognition. However, the subject does not know whether the imaging unit 10 substantially located at the same height as that of the face is the imaging unit 10 suitable for capturing the subject's face and does not know toward which direction (specifically, toward which imaging unit 10) the face is to be directed.

For this reason, the imaging support apparatus 1 of the first embodiment suggests a direction toward which the subject' face is to be directed so that the face image suitable for face recognition is captured by the imaging unit 10. Hereinafter, a method of the first embodiment will be described.

The imaging units 10-1 to 10-3 capture the subject's face. When capturing the subject's face by the imaging units 10-1 to 10-3 at this time point, the subject may direct his/her face toward any direction.

Figure 2:
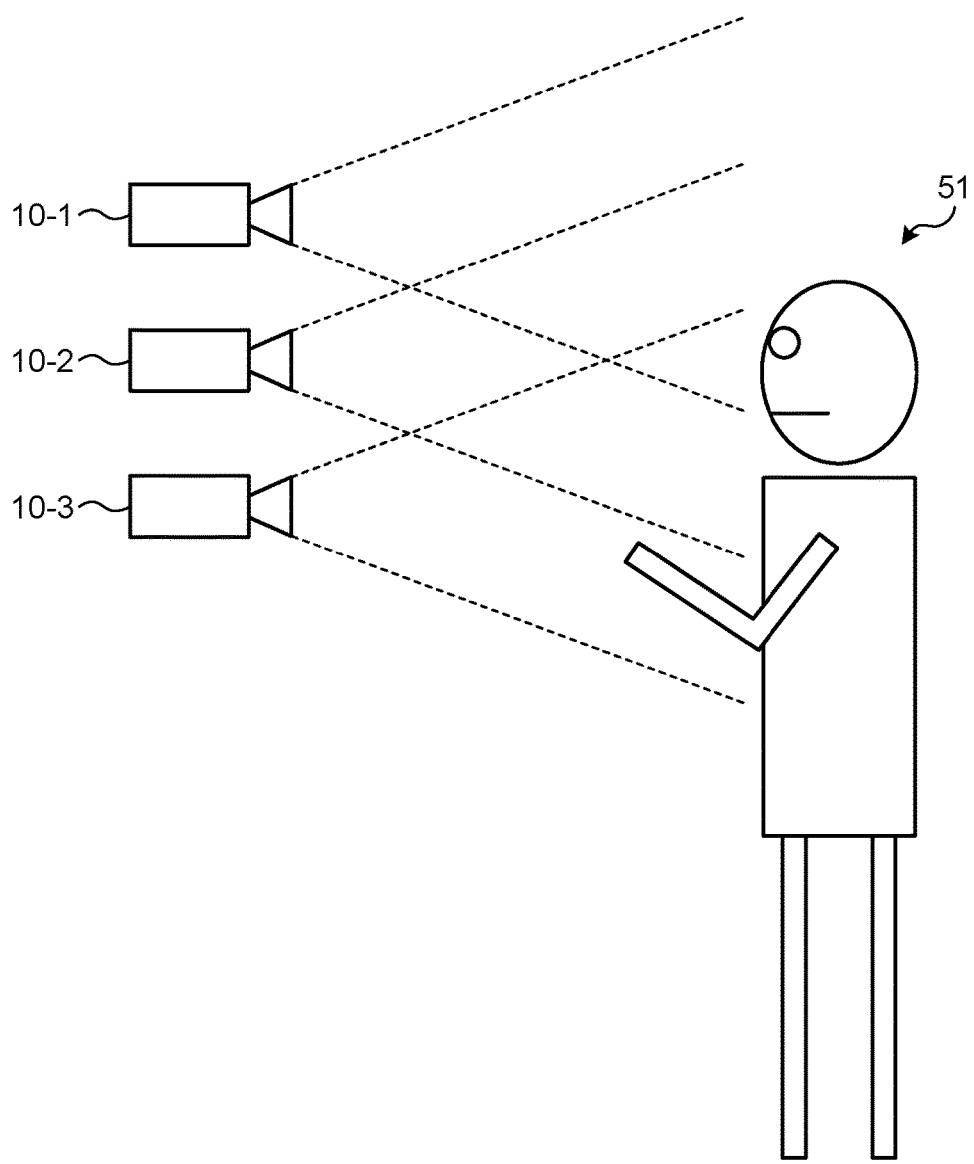
FIG. 2 is a schematic diagram illustrating an example of an imaging unit of the first embodiment.

FIG. 2 is a schematic diagram illustrating an example of the imaging units 10-1 to 10-3 of the first embodiments. In the example illustrated in FIG. 2, the imaging units 10-1 to 10-3 are arranged in series in the vertical direction and capture a face of a subject 51 located at an imaging position. However, the imaging units 10-1 to 10-3 may not be arranged in series as long as the imaging units 10-1 to 10-3 are arranged in the vertical direction. For example, the imaging units 10-1 to 10-3 may be arranged in a matrix shape or a circular-arc shape. Further, the imaging units 10-1 to 10-3 are fixed to be directed forward without a depression angle or an elevation angle.

The acquisition unit 11 acquires a plurality of images obtained by capturing an image of the subject's face through the imaging units 10-1 to 10-3.

Figure 3:
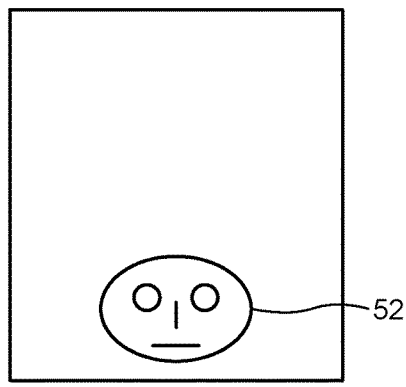
FIG. 3 is a diagram illustrating an example of an image captured by the imaging unit of the first embodiment.
Figure 4:
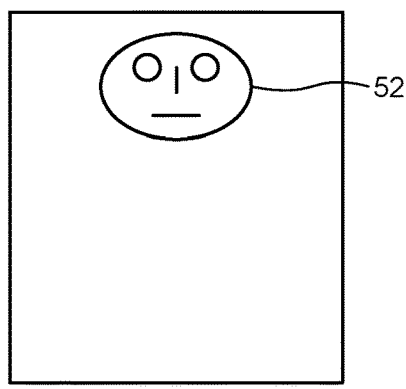
FIG. 4 is a diagram illustrating an example of an image captured by the imaging unit of the first embodiment.
Figure 5:
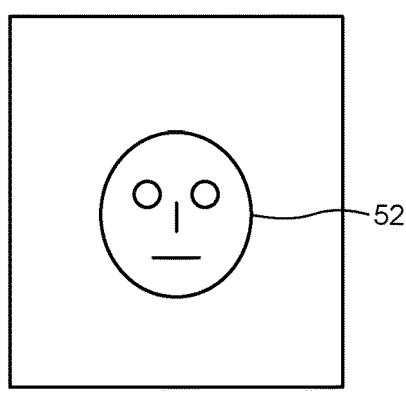
FIG. 5 is a diagram illustrating an example of an image captured by the imaging unit of the first embodiment.

FIG. 3 is a diagram illustrating an example of an image captured by the imaging unit 10-1 of the first embodiment, FIG. 4 is a diagram illustrating an example of an image captured by the imaging unit 10-3 of the first embodiment, and FIG. 5 is a diagram illustrating an example of an image captured by the imaging unit 10-2 of the first embodiment.

As illustrated in FIG. 2, since the imaging unit 10-1 is disposed at a position higher than the face of the subject 51, the face of the subject 51 is locate below the optical axis of the imaging lens of the imaging unit 10-1. For this reason, in an image obtained by capturing an image of the face of the subject 51 through the imaging unit 10-1, a face 52 of the subject 51 is located at the lower side of the image as illustrated in FIG. 3 and thus is influenced by the lens distortion of the imaging lens.

Further, since the imaging unit 10-3 is disposed at a position lower than the face of the subject 51 as illustrated in FIG. 2, the face of the subject 51 is located above the optical axis of the imaging lens of the imaging unit 10-3. For this reason, in an image obtained by capturing an image of the face of the subject 51 through the imaging unit 10-3, the face 52 of the subject 51 is located at the upper side of the image as illustrated in FIG. 4 and thus is influenced by the lens distortion of the imaging lens.

Further, since the imaging unit 10-2 is substantially disposed at the same height position as that of the face of the subject 51 as illustrated in FIG. 2, the face of the subject 51 is located near the optical axis of the imaging lens of the imaging unit 10-2. For this reason, in an image obtained by capturing an image of the face of the subject 51 through the imaging unit 10-2, the face 52 of the subject 51 is located near the center of the image as illustrated in FIG. 5 and thus is not influenced by the lens distortion of the imaging lens (the influence of the lens distortion is suppressed).

The extraction unit 13 extracts a face area from each of the plurality of images acquired by the acquisition unit 11. The face area may be extracted by using a known face detection technology. For example, "Discriminative Feature Co-Occurrence Selection for Object Detection" written by Takeshi Mita, Toshimitsu Kaneko, Bjorn Stenger, and Osamu Hori may be used. Alternatively, technologies disclosed in IEEE Transaction Pattern Analysis and Machine Intelligence Volume 30, Number 7, July 2008, pp. 1257-1269 may be used. In addition, the shape of the extracted face area may have an arbitrary shape such as a rectangular shape or a circular shape.

The specification unit 15 specifies a certain imaging unit as the imaging unit 10 suitable for capturing an image of the subject's face among the imaging units 10-1 to 10-3 based on the position of the face area extracted by the extraction unit 13 in the plurality of images acquired by the acquisition unit 11. The certain imaging unit is the imaging unit 10 which is substantially located at the same height as that of the subject's face.

Specifically, the specification unit 15 calculates a distance between the center of the image and the center of the face area extracted from the image by the extraction unit 13 every image acquired by the acquisition unit 11. Then, the specification unit 15 specifies the imaging unit 10 which captures an image in which a distance between the center of the image and the center of the face area is the shortest as the certain imaging unit in the plurality of images acquired by the acquisition unit 11.

Accordingly, in the examples illustrated in FIGS. 2 to 5, the imaging unit 10-2 which captures the image illustrated in FIG. 5 is specified as the certain imaging unit.

The suggestion control unit 17 causes the suggestion unit 3 to suggest a direction toward which the subject's face is to be directed for imaging the subject's face by the certain imaging unit specified by the specification unit 15.

Figure 6:
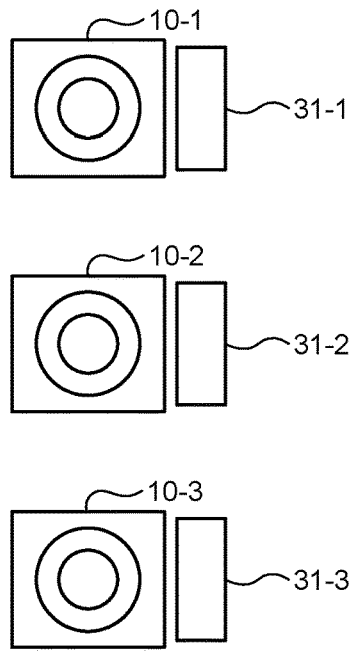
FIG. 6 is a schematic diagram illustrating an example of a light emitting unit of the first embodiment.

In the first embodiment, the suggestion unit 30 includes the light emitting units 31-1 to 31-3 as described above. As illustrated in FIG. 6, the light emitting units 31-1 to 31-3 are respectively associated with the imaging units 10-1 to 10-3.

Then, the suggestion control unit 17 causes the light emitting unit 31 associated with the certain imaging unit specified by the specification unit 15 to emit light. In the examples illustrated in FIGS. 2 to 6, the light emitting unit 31-2 associated with the imaging unit 10-2 capturing the image illustrated in FIG. 5 emits light.

Accordingly, the suggestion unit suggests to the subject to direct his/her face toward the light emitting unit 31 which emits light (specifically, toward the certain imaging unit associated with the light emitting unit 31 which emits light). As a result, when the subject's face is directed toward the light emitting unit 31 which emits light, the subject's face is directed toward the certain imaging unit substantially located in front of the subject's face. For this reason, the certain imaging unit can capture a face image suitable for face recognition, that is, an image in which the face is directed forward and the face is not distorted (an image in which the distortion of the face is suppressed).

Figure 7:
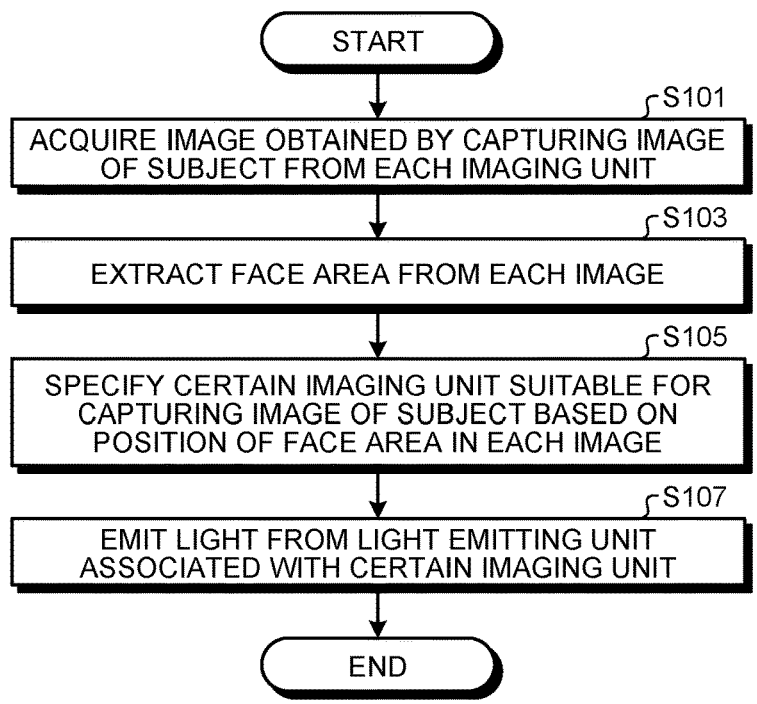
FIG. 7 is a flowchart illustrating a process example of the first embodiment.

FIG. 7 is a flowchart illustrating an example of a flow of a process performed by the imaging support apparatus 1 of the first embodiment.

First, the acquisition unit 11 acquires an image obtained by capturing an image of the subject's face from each of the imaging units 10-1 to 10-3 (step S101).

Next, the extraction unit 13 extracts a face area from each of the plurality of images acquired by the acquisition unit 11 (step S103).

Next, the specification unit 15 specifies a certain imaging unit as the imaging unit 10 suitable for capturing the subject's face among the imaging units 10-1 to 10-3 based on the position of the face area extracted by the extraction unit 13 in the plurality of images acquired by the acquisition unit 11 (step S105).

Next, the suggestion control unit 17 causes the light emitting unit 31 associated with the certain imaging unit specified by the specification unit 15 to emit light (step S107).

When the face area cannot be extracted in step S103, the routine may return to step S101 to perform a process again.

As described above, in the first embodiment, the suggestion unit presents a certain imaging unit (substantially located at the same height as the subject's face) suitable for capturing the subject's face among the imaging units 10 including the imaging units 10-1 to 10-3 and suggests to the subject to direct the subject's face toward the certain imaging unit. Thus, according to the first embodiment, since the certain imaging unit can capture a face image suitable for face recognition, that is, an image in which the face is directed forward and the face is not distorted (an image in which the distortion of the face is suppressed), it is possible to support a method of capturing an image suitable for face recognition.

First Modified Example

In the first embodiment, an example has been described in which the imaging unit 10 correspond to the light emitting unit 31 one to one, but the embodiment is not limited thereto. For example, the number of the light emitting units 31 may be larger than the number of the imaging units 10 (a relation of N<M is allowed).

Figure 8:
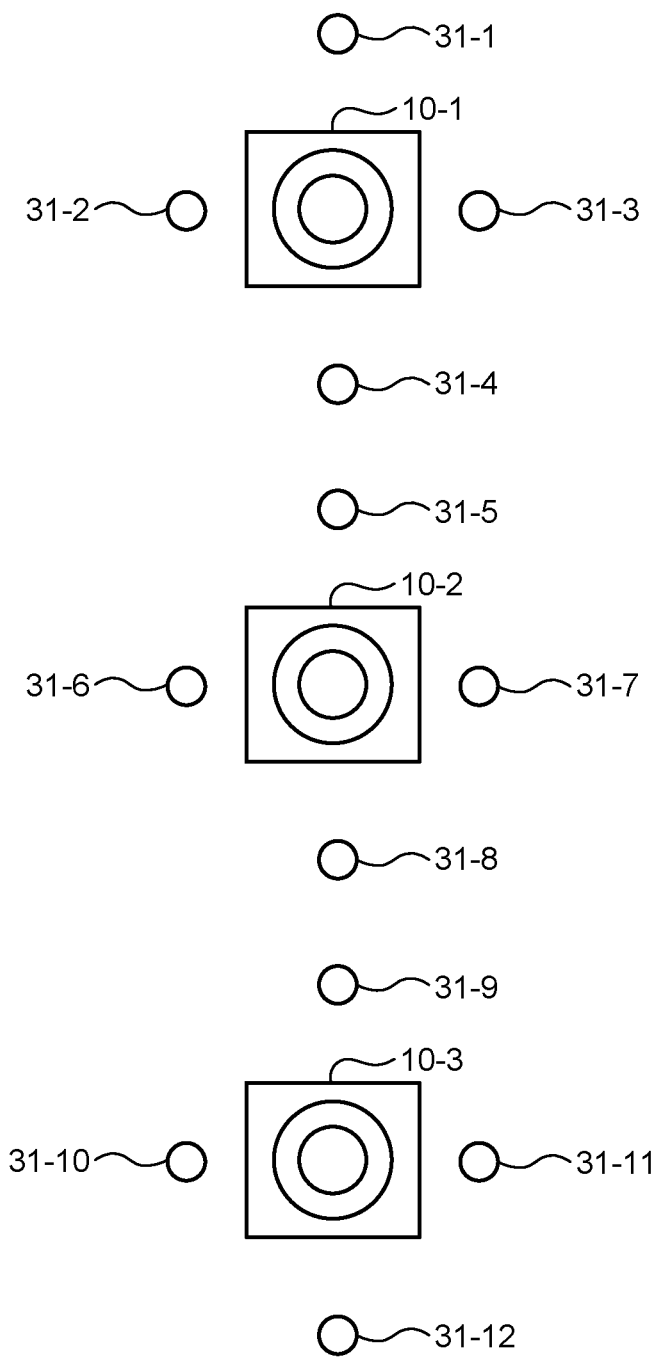
FIG. 8 is a schematic diagram illustrating an example of a light emitting unit of a first modified example.

For example, in the example illustrated in FIG. 8, the number of the light emitting units is twelve (M=12) and the light emitting units 31-1 to 31-12 are arranged in the periphery of the imaging units 10-1 to 10-3. Then, the suggestion control unit 17 causes the light emitting unit 31 located in a direction, toward which the subject face is to be directed for capturing an image by a certain imaging unit, to emit light.

According to the first modified example, it is possible to present a direction toward which the subject's face is to be directed in more detail compared with the first embodiment.

Furthermore, in the first modified example, the suggestion control unit 17 may determine the light emitting unit 31 which emits light among the light emitting units 31-1 to 31-12 by the use of a positional relation between the center of the image captured by the certain imaging unit and the center of the face area on the image in addition to the certain imaging unit specified by the specification unit 15.

For example, it is assumed that the imaging unit 10-2 is specified as a certain imaging unit by the specification unit 15 and the center of the face area is located above the center of the image captured by the certain imaging unit. In this case, since the position of the subject's face is supposed to be slightly higher than the certain imaging unit, the suggestion control unit 17 may cause the light emitting unit 31-5, which is considered to be located at a position closest to the front side of the subject's face, to emit light.

Second Modified Example

In the first embodiment, a case has been described in which the light emitting unit 31 is associated with the imaging unit 10, but the embodiment is not limited thereto. For example, identification information for identifying the imaging unit 10 may be associated with the imaging unit 10 and the suggestion control unit 17 may cause the suggestion unit 30 to present the identification information associated with the certain imaging unit. In this case, the suggestion unit 30 may be implemented as a display or a board having an LED or a lamp embedded therein.

Furthermore, the suggestion unit 30 may be provided in parallel to the imaging unit 10, may be provided near the subject, or may be provided in any place. For example, when a manual operation of the subject is necessary to capture an image by the imaging unit 10, the suggestion unit 30 may be provided on an operation panel. Further, when there is need to read face recognition information (for example, a picture) for the face recognition, the suggestion unit 30 may be provided in parallel to a reading device.

For example, in the example illustrated in FIG. 9, a mark 32-1 for identifying the imaging unit 10-1 is associated with the imaging unit 10-1, a mark 32-2 for identifying the imaging unit 10-2 is associated with the imaging unit 10-2, and a mark 32-3 for identifying the imaging unit 10-3 is associated with the imaging unit 10-3.

Further, in the example illustrated in FIG. 10, the suggestion unit 30 is implemented by a board having LEDs embedded therein. Specifically, marks 33-1 to 33-3 respectively corresponding to the marks 32-1 to 32-3 are depicted in the suggestion unit 30 and the lights of the marks 33-1 to 33-3 are individually turned on by the embedded LEDs.

Further, when there is no need to distinguish the marks 32-1 to 32-3 in the description below, the mark 32 is used simply. When there is no need to distinguish the marks 33-1 to 33-3 in the description below, the mark 33 is used simply.

In this case, the suggestion control unit 17 turns on the light of the mark 33 corresponding to the mark 32 associated with the certain imaging unit specified by the specification unit 15 in the suggestion unit 30. Accordingly, the suggestion unit suggests to the subject to direct the subject' face toward the mark 32 corresponding to the lighted mark 33 (specifically, toward the direction of the certain imaging unit associated with the mark 32).

Third Modified Example

In the second modified example, a case has been described in which the imaging unit 10 corresponds to the identification information one to one, but the embodiment is not limited thereto. For example, the number of pieces of identification information may be larger than the number of the imaging units 10.

Figure 11:
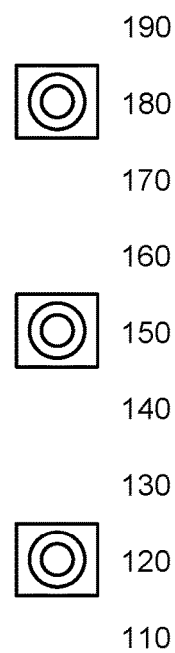
FIG. 11 is a schematic diagram illustrating an example of identification information of a third modified example.

For example, in the example illustrated in FIG. 11, numerical values (110 to 190) indicating a human height which is identification information are arranged in the periphery of the imaging units 10-1 to 10-3.

Figure 12:
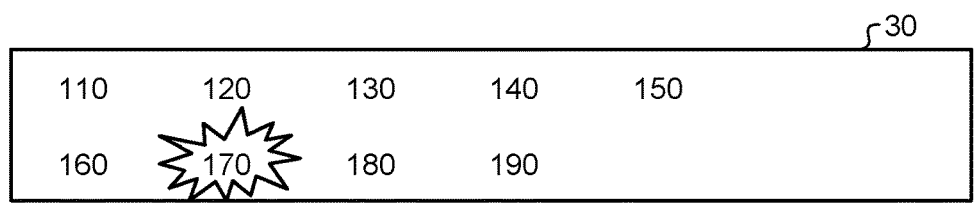
FIG. 12 is a schematic diagram illustrating an example of a suggestion unit of the third modified example.

Further, in the example illustrated in FIG. 12, the numerical values (110 to 190) indicating the human height are depicted in the suggestion unit 30 and the lights of the numerical values (110 to 190) indicating the human height are individually turned on by the embedded LEDs.

In this case, the suggestion control unit 17 turns on the light of the numerical value located in a direction toward which the subject' face is to be directed for capturing an image by the certain imaging unit in the suggestion unit 30. According to the third modified example, it is possible to suggest the direction toward which the subject's face is to be directed in more detail compared with the second modified example.

Also in the third modified example, the suggestion control unit 17 may determine the numerical value to be turned on among the numerical values (110 to 190) indicating the human height by the use of a positional relation between the center of the image captured by the certain imaging unit and the center of the face area on the image in addition to the certain imaging unit specified by the specification unit 15 based on the same method as that of the first modified example.

Fourth Modified Example

In the first embodiment, a case has been described in which the light emitting unit 31 is associated with the imaging unit 10, but the embodiment is not limited thereto. For example, the suggestion control unit 17 may cause the suggestion unit 30 to suggest to the subject to direct the subject's face toward the certain imaging unit. In this case, the suggestion unit 30 can be implemented as a display.

Furthermore, the suggestion unit 30 may be provided in parallel to the imaging unit 10, may be provided near the subject, or may be provided in any place. For example, when a manual operation of the subject is necessary to capture an image by the imaging unit 10, the suggestion unit 30 may be provided on an operation panel. Further, when there is need to read face recognition information (for example, a picture) for the face recognition, the suggestion unit 30 may be provided in parallel to a reading device.

Figure 13:
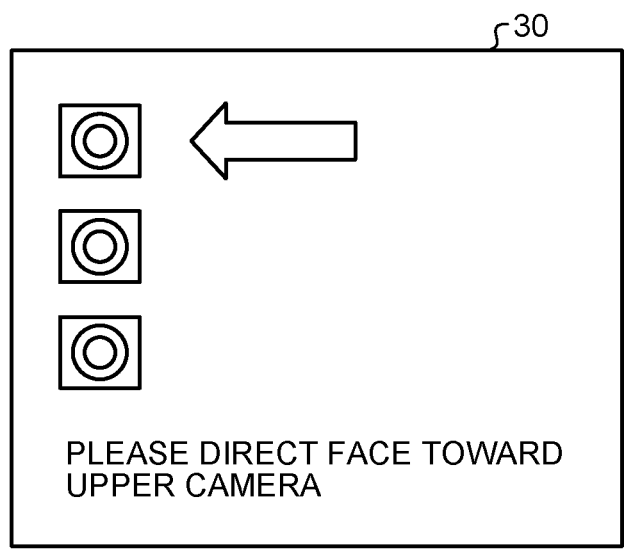
FIG. 13 is a schematic diagram illustrating an example of a suggestion unit of a fourth modified example.

In this case, as illustrated in FIG. 13, the suggestion control unit 17 causes the suggestion unit 30 to present, on the suggestion unit 30, which of the imaging units 10-1 to 10-3 is the certain imaging unit and to suggest to the subject to direct the subject's face toward the certain imaging unit.

Second Embodiment

In a second embodiment, a face recognition process using a face image which is suitable for face recognition and is captured by a certain imaging unit will be described. Hereinafter, a difference from the first embodiment will be mainly described. Then, the same reference numerals and signs as those of the first embodiment will be given to the components having the same functions as those of the first embodiment and the description thereof will be omitted.

Figure 14:
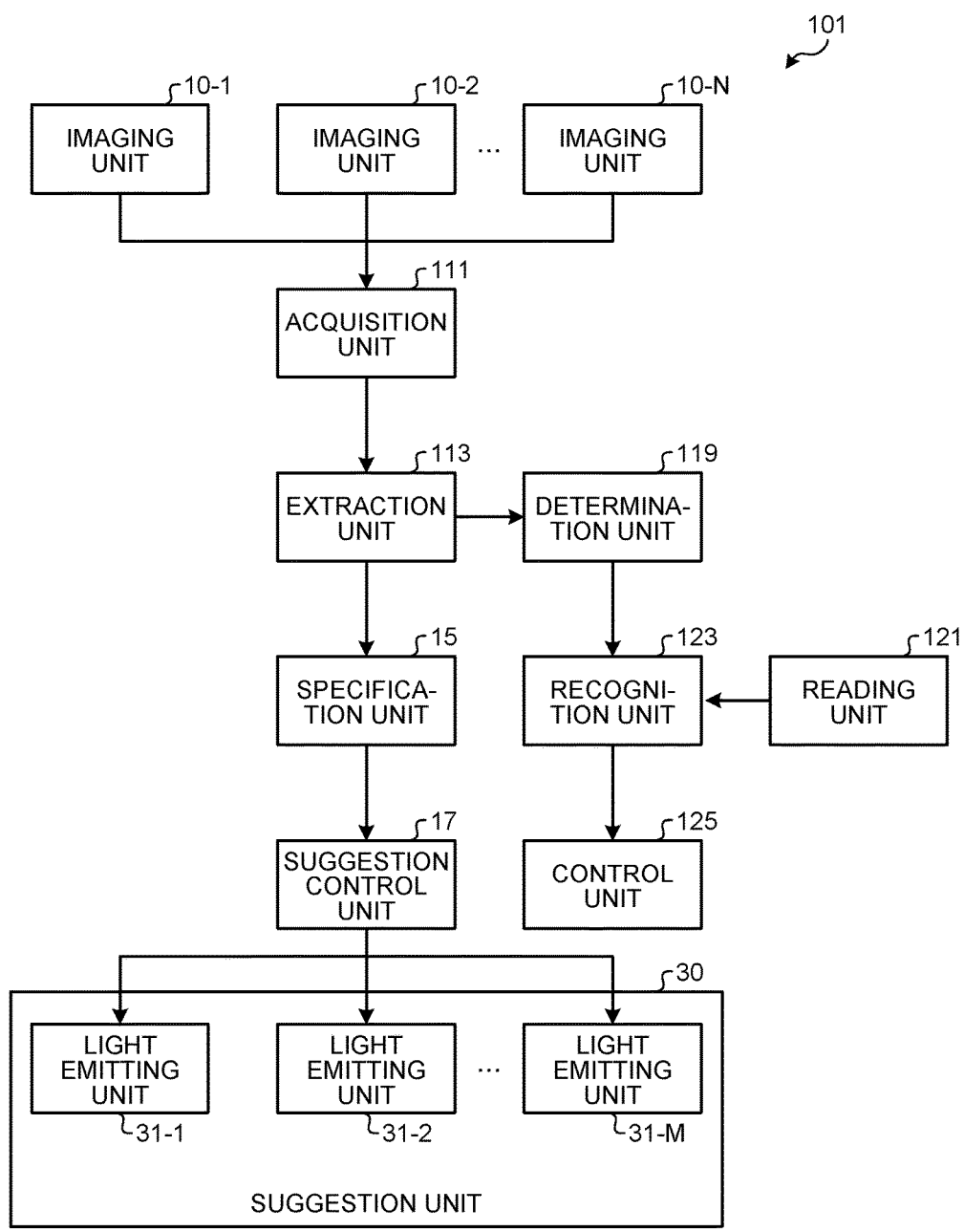
FIG. 14 is a configuration diagram illustrating an example of an imaging support apparatus of a second embodiment.

FIG. 14 is a configuration diagram illustrating an example of an imaging support apparatus 101 of the second embodiment. As illustrated in FIG. 14, an acquisition unit 111, an extraction unit 113, a determination unit 119, a reading unit 121, a recognition unit 123, and a control unit 125 in the imaging support apparatus 101 of the second embodiment are different from those of the first embodiment.

A method of suggesting the direction toward which the subject's face is to be directed is similar to that of the first embodiment.

The acquisition unit 111 further acquires a recognition image obtained by capturing an image of a subject's face by a certain imaging unit after the suggestion of the suggestion unit 30. That is, the acquisition unit 111 acquires a face image suitable for face recognition, that is, an image in which the subject's face is directed forward and the subject's face is not distorted (an image in which the distortion of the face of the subject is suppressed) from the certain imaging unit.

The extraction unit 113 extracts a face area from the recognition image acquired by the acquisition unit 111. Further, the face area extraction method is similar to that of the first embodiment.

The determination unit 119 determines whether the face area is suitable for collation based on the face area extracted by the extraction unit 113. Specifically, the determination unit 119 determines whether the face area is suitable for collation based on the position or the direction of the face area extracted by the extraction unit 113 in the recognition image acquired by the acquisition unit 111.

For example, the determination unit 119 calculates a distance between the center of the recognition image acquired by the acquisition unit 111 and the center of the face area extracted by the extraction unit 113. Then, when the calculated distance is equal to or shorter than a distance threshold value, the face is not distorted (the distortion of the face of the subject is suppressed) and thus the face area is suitable for collation. In contrast, when the calculated distance exceeds the distance threshold value, the face is distorted (the distortion of the face is large) and thus the face area is not suitable for collation.

Further, for example, the determination unit 119 determines that the face area is suitable for collation when the face area (the face on the recognition image) extracted by the extraction unit 113 is directed forward and determines that the face area is not suitable for collation when the face area is not directed forward.

The face direction may be identified using a known identification technology, for example, a technology disclosed by Tomoki Watanabe, Satoshi Ito, Kentaro Yokoi: "Co-occurrence Histogram of Oriented Gradients for Human Detection", IPSJ Transaction on Computer Vision and Applications Volume 2 March 2010, pp. 39-47. Here, in this technology, a two-class identifier is used to identify whether an input pattern is a "person" or a "non-person". For this reason, in the second embodiment, the two-class identifier may be used to identify whether the "face is directed forward" or the "face is not directed forward."

The reading unit 121 reads face information of a collation source person. In the second embodiment, the reading unit 121 reads the face information of the collation source person from a card which is possessed by the subject or an IC embedded in a book, but the embodiment is not limited thereto. In the second embodiment, the face information of the collation source person is the face image of the collation source person, but the embodiment is not limited thereto. For example, the feature vector of the face of the collation source person may be used.

When the determination unit 119 determines that the face area extracted by the extraction unit 113 is suitable for collation, the recognition unit 123 acquires the face information of the collation source person from the reading unit 121 and collates the face on the face area extracted by the extraction unit 113 based on the face information to recognize whether the subject is the collation source person.

Specifically, the recognition unit 123 cuts out the face area extracted by the extraction unit 113 from the recognition image acquired by the acquisition unit 111 to use the cut face area as the face image. When a left upper coordinate of the rectangular face area is set as "x1, y1" and a right lower coordinate thereof is set as "x2, y2", a cut image of the face area having a horizontal width x2 to x1 and a vertical width y2 to y1 becomes the face image. Here, the face image is not limited thereto. For example, the recognition unit 123 may set an image generated by detecting a face feature point of the recognition image and normalizing the face area based on the face feature point as the face image.

The recognition unit 123 also performs the same process as that of the recognition image on the face information of the collation source person (the face image) acquired from the reading unit 121 if necessary.

Next, the recognition unit 123 extracts a face feature vector from both face images. In the second embodiment, as the face feature vector, a feature vector in which a vector obtained by arranging luminance values is normalized to a length of 1 is used, but the embodiment is not limited thereto. A vector obtained by arranging luminance values of an image obtained by applying a Sobel filter or a Gabor filter to the face image may be used. In addition, the recognition unit 123 may further apply a linear transformation such as a whitening transformation on the extracted face feature vector.

Next, the recognition unit 123 calculates the face similarity of both face feature vectors. In the second embodiment, as the face similarity, an inner product between the face feature vectors is used, but the embodiment is not limited thereto. For example, a vector distance may be used. Since the face feature vector is a vector having a length of 1, the inner product is equal to the simple similarity.

Thus, in the second embodiment, the face similarity is expressed by $x1y1+x2y2+ \ldots +xdyd$. Here, $(x1, \ldots, xd)$ and $(y1, \ldots, yd)$ indicate a vector having a length of 1 in the face feature vector.

When the face information of the collation source person is the face feature vector of the collation source person, the recognition unit 123 calculates the face similarity between the face feature vector extracted from the face image of the recognition image and the face feature vector of the collation source person using the above-described method.

Then, when the calculated face similarity exceeds a face recognition threshold value, the recognition unit 123 recognizes that the subject is the collation source person. In contrast, when the calculated face similarity is equal to or smaller than the face recognition threshold value, the recognition unit 123 recognizes that the subject is not the collation source person.

The control unit 125 performs a control in accordance with the recognition result of the recognition unit 123. For example, when the recognition unit 123 recognizes that the subject is the collation source person, the control unit 125 performs a control of opening a gate or unlocking a door. In contrast, when the recognition unit 123 recognizes that the subject is not the collation source person, the control unit 125 does not perform a control of opening a gate or unlocking a door.

Figure 15:
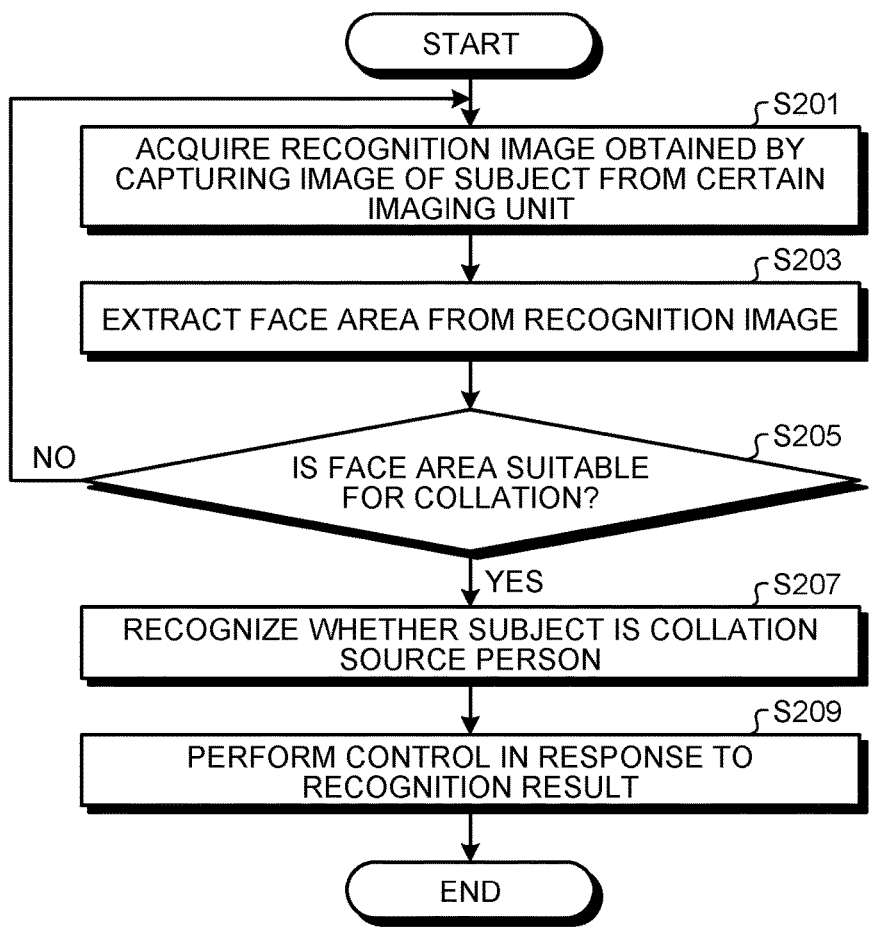
FIG. 15 is a flowchart illustrating a process example of the second embodiment.

FIG. 15 is a flowchart illustrating an example of a process performed by the imaging support apparatus 101 of the second embodiment.

First, the acquisition unit 111 acquires a recognition image obtained by capturing an image of a subject's face by a certain imaging unit after the suggestion of the suggestion unit 30 (step S201).

Next, the extraction unit 113 acquires a face area from the recognition image acquired by the acquisition unit 111 (step S203).

Next, the determination unit 119 determines whether the face area is suitable for collation based on the face area extracted by the extraction unit 113 (step S205). Additionally, when the face area is not suitable for collation (No in step S205), a routine returns to step S201 to perform a process again.

Meanwhile, when the face area is suitable for collation (Yes in step S205), the reading unit 121 reads the face information of the collation source person and the recognition unit 123 acquires the face information of the collation source person from the reading unit 121 and collates the face on the face area extracted by the extraction unit 113 based on the face information to recognize whether the subject is the collation source person (step S207).

Next, the control unit 125 performs a control in accordance with the recognition result of the recognition unit 123 (step S209).

When the face area cannot be extracted in step S203, the routine may return to step S201 to perform a process again.

As described above, in the second embodiment, since the recognition image is the face image suitable for face recognition, that is, the image in which the face is directed forward and the face is not distorted (the image in which the distortion of the face is suppressed), it is possible to improve the face recognition accuracy.

Third Embodiment

In a third embodiment, an example will be described in which a face recognition process is performed by an image when an image first captured by a certain imaging unit is a face image suitable for face recognition. Hereinafter, a difference from the second embodiment will be mainly described. Then, the same reference numerals and signs as those of the second embodiment will be given to the components having the same functions as those of the second embodiment and the description thereof will be omitted.

Figure 16:
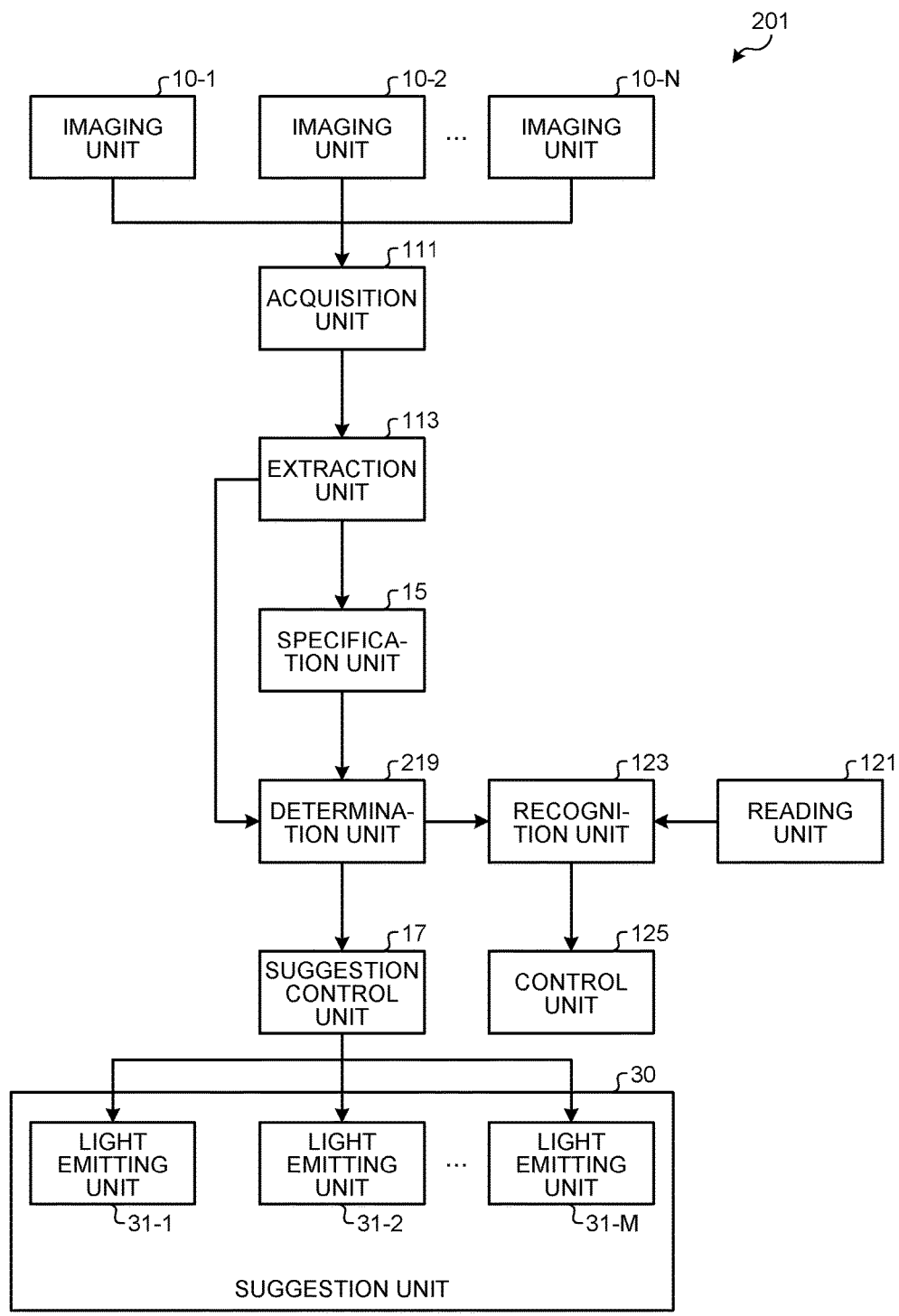
FIG. 16 is a configuration diagram illustrating an example of the imaging support apparatus of the second embodiment.

FIG. 16 is a configuration diagram illustrating an example of an imaging support apparatus 201 of the third embodiment. As illustrated in FIG. 16, a determination unit 219 in the imaging support apparatus 201 of the third embodiment is different from that of the second embodiment.

The determination unit 219 determines whether a face area is suitable for collation based on the face area extracted from the image captured by the certain imaging unit specified by the specification unit 15. A method of determining whether the face area is suitable for collation is similar to that of the first embodiment.

Figure 17:
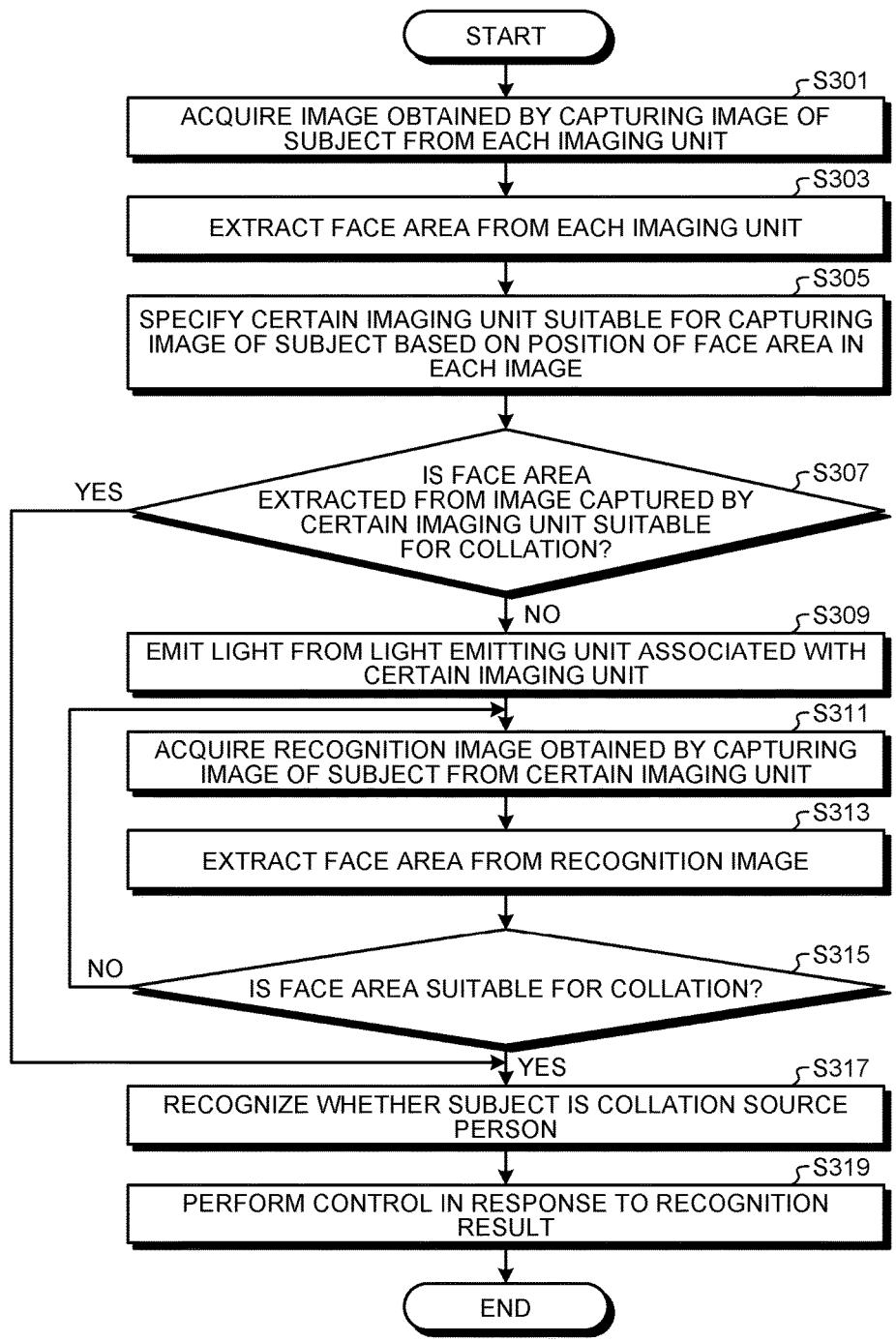
FIG. 17 is a flowchart illustrating a process example of the second embodiment.

FIG. 17 is a flowchart illustrating an example of a flow of a process performed by the imaging support apparatus 201 of the third embodiment.

First, the processes from step S301 to step S305 are similar to those of step S101 to step S105 of the flowchart illustrated in FIG. 7.

Next, the determination unit 219 determines whether the face area is suitable for collation based on the face area extracted by the extraction unit 113 from the image captured by the certain imaging unit specified by the specification unit 15 (step S307). Additionally, when the face area is suitable for collation (Yes in step S307), the routine proceeds to step S317.

Meanwhile, when the face area is not suitable for collation (No in step S307), the suggestion control unit 17 causes the light emitting unit 31 associated with the certain imaging unit specified by the specification unit 15 to emit light (step S309).

The processes from step S311 to step S319 are similar to those of step S201 to step S209 of the flowchart illustrated in FIG. 15.

As described above, in the third embodiment, when the image first captured by the certain imaging unit is the face image suitable for face recognition, the face recognition is performed by using the image. For this reason, it is possible to shorten a time necessary for recognition (specifically, a time necessary until the recognition).

Fifth Modified Example

In the second and third embodiments, a case in which the face information of the collation source person is read by the reading unit 121 has been exemplified, but the embodiment is not limited thereto. For example, the face information of the collation source person may be stored in a storage unit of the imaging support apparatus in advance.

Hardware Configuration

Figure 18:
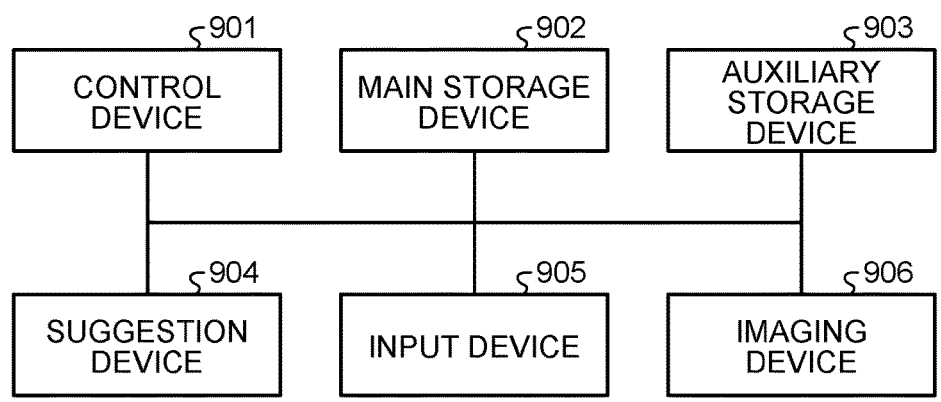
FIG. 18 is a configuration diagram illustrating hardware configuration examples of the imaging support apparatuses of the embodiments and the modified examples.

FIG. 18 is a configuration diagram illustrating an example of a hardware configuration of the imaging support apparatuses of the above-described embodiments and modified examples. As illustrated in FIG. 18, the imaging support apparatuses of the above-described embodiments and modified examples include a control device 901 such as a CPU, a main storage device 902 such as a ROM and a RAM, an auxiliary storage device 903 such as a HDD or an SSD, a suggestion device 904 such as an LED, a lamp, or a display, an input device 905 such as a mouse and a keyboard, and an imaging device 906 such as a camera and can be implemented by a hardware configuration using a general computer.

A program which is executed by the imaging support apparatuses of the above-described embodiments and modified examples is supplied while being stored in a ROM or the like in advance.

Further, the program which is executed by the imaging support apparatuses of the above-described embodiments and modified examples may be supplied while being stored in a computer readable storage medium such as a CD-ROM, a CD-R, a memory card, a DVD, or a flexible disk (FD) as a file which can be installed or executed.

Further, the program which is executed by the imaging support apparatuses of the above-described embodiments and modified examples may be stored in a computer connected to a network such as an internet and may be downloaded to the other computers via the network. Further, the program which is executed by the imaging support apparatuses of the above-described embodiments and modified examples may be supplied and distributed via a network such as an internet.

The program which is executed by the imaging support apparatuses of the above-described embodiments and modified examples is configured as a module for implementing the above-described components on a computer. As actual hardware, for example, when the control device 901 executes a program by reading the program from the auxiliary storage device 903 onto the main storage device 902, the above-described components are implemented on the computer.

As described above, according to the above-described embodiments and modified examples, it is possible to support an operation of capturing an image suitable for face recognition.

For example, the steps of the flowcharts of the embodiments may be performed in a changed order or at the same time as long as the functions thereof are not changed or may be performed in a different order in each embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging support apparatus comprising:
a memory; and
a processor coupled to the memory, wherein the processor is configured to:
    acquire a plurality of images obtained by imaging a face of a subject by a plurality of imaging devices;
    extract a face area from each of the plurality of images;
    specify a certain imaging device as an imaging device suitable for imaging the face of the subject face among the plurality of imaging devices based at least in part on a position of the face area in each of the plurality of images; and
    cause a suggestion device to suggest a direction toward which the face of the subject is to be directed for imaging the face of the subject by the certain imaging device, wherein
    the processor is further configured to specify the certain imaging device which captures an image in which a distance between a center of the image and a center of the face area is shortest as the imaging device suitable for imaging the face of the subject.

2. The apparatus according to claim 1, wherein
the suggestion device includes a plurality of light emitters respectively associated with the plurality of imaging devices, and
in causing, the processor is configured to cause the light emitter associated with the certain imaging device to emit light.

3. The apparatus according to claim 1, wherein
the suggestion device includes a plurality of light emitters, and
in causing, the processor is configured to cause the light emitter located in the direction toward which the face of the subject is to be directed to emit light.

4. The apparatus according to claim 1, wherein
the plurality of imaging devices are respectively associated with pieces of identification information for identifying the imaging devices, and
in causing, the processor is configured to cause the suggestion device to present the identification information associated with the certain imaging device.

5. The apparatus according to claim 1, wherein
a plurality of pieces of identification information are provided in the periphery of the plurality of imaging devices, and
in causing, the processor is configured to cause the suggestion device to suggest the identification information located in the direction toward which the face of the subject is directed for imaging the face of the subject by the certain imaging device.

6. The apparatus according to claim 1, wherein
in causing, the processor is configured to cause the suggestion device to suggest to the subject to direct the face toward the certain imaging device.

7. The apparatus according to claim 1, wherein the plurality of imaging devices are arranged in a vertical direction.

8. The apparatus according to claim 1, wherein the processor is further configured to:
acquire a recognition image captured by the certain imaging device after the suggestion of the suggestion device,
extract a face area from the recognition image,
acquire a face information of a collation source person,
collate a face on the face area based on the face information, and
recognize whether the subject is the collation source person.

9. The apparatus according to claim 8, wherein
the processor is further configured to determine whether the face area is suitable for the collation based on the face area, and
in recognizing, the processor is configured to, when the face area is suitable for the collation, recognize whether the subject is the collation source person.

10. The apparatus according to claim 1, wherein
the processor is further configured to determine whether the face area is suitable for collation based on the face area extracted from the image captured by the certain imaging device; and
the processor is configured to:
in acquiring the face information, when the face area is suitable for the collation, acquire face information of a collation source person,
in collating, collate a face on the face area based on the face information, and
in recognizing, recognize whether the subject is the collation source person.

11. The apparatus according to claim 1, further comprising:
the plurality of imaging devices: and
the suggestion device.

12. An imaging support method comprising:
acquiring a plurality of images obtained by imaging a face of a subject by a plurality of imaging devices;
extracting a face area from each of the plurality of images;
specifying a certain imaging device as an imaging device suitable for imaging the face of the subject among the plurality of imaging devices based on a position of the face area in each of the plurality of images; and
causing a suggestion device to suggest a direction toward which the face of the subject is to be directed for imaging the face of the subject by the certain imaging device, wherein
the specifying includes specifying the certain imaging device which captures an image in which a distance between a center of the image and a center of the face area is shortest as the imaging device suitable for imaging the face of the subject.

13. The method according to claim 12, wherein
the suggestion device includes a plurality of light emitters respectively associated with the plurality of imaging devices, and
the causing includes causing the light emitter associated with the certain imaging device to emit light.

14. The method according to claim 12, wherein
the suggestion device includes a plurality of light emitters, and
the causing includes causing the light emitter located in the direction toward which the face of the subject is to be directed to emit light.

15. The method according to claim 12, wherein
the plurality of imaging devices are respectively associated with pieces of identification information for identifying the imaging devices, and
the causing includes causing the suggestion device to present the identification information associated with the certain imaging device.

16. The method according to claim 12, wherein
a plurality of pieces of identification information are provided in the periphery of the plurality of imaging devices, and
the causing includes causing the suggestion device to suggest the identification information located in the direction toward which the face of the subject is directed for imaging the face of the subject by the certain imaging device.

17. The method according to claim 12, wherein
the causing includes causing the suggestion device to suggest to the subject to direct the face toward the certain imaging device.

18. The method according to claim 12, wherein the plurality of imaging devices are arranged in a vertical direction.

19. The method according to claim 12, further comprising:
acquiring a recognition image captured by the certain imaging device after the suggestion of the suggestion device,
extracting a face area from the recognition image,
acquiring a face information of a collation source person,
collating a face on the face area based on the face information, and
recognizing whether the subject is the collation source person.

20. A computer program product comprising a non-transitory computer-readable medium including programmed instructions, the instructions causing a computer to perform:
acquiring a plurality of images obtained by imaging a face of a subject by a plurality of imaging devices;
extracting a face area from each of the plurality of images;
specifying a certain imaging device as an imaging device suitable for imaging the face of the subject among the plurality of imaging devices based on a position of the face area in each of the plurality of images; and
causing a suggestion device to suggest a direction toward which the face of the subject is to be directed for imaging the face of the subject by the certain imaging device, wherein the specifying includes specifying the certain imaging device which captures an image in which a distance between a center of the image and a center of the face area is shortest as the imaging device suitable for imaging the face of the subject.

* * * * *